June 6, 1967
T. B. O'CONNELL ET AL
3,323,927
GLASS CONTACTING REFRACTORIES
Filed Nov. 6, 1961
3 Sheets-Sheet 1
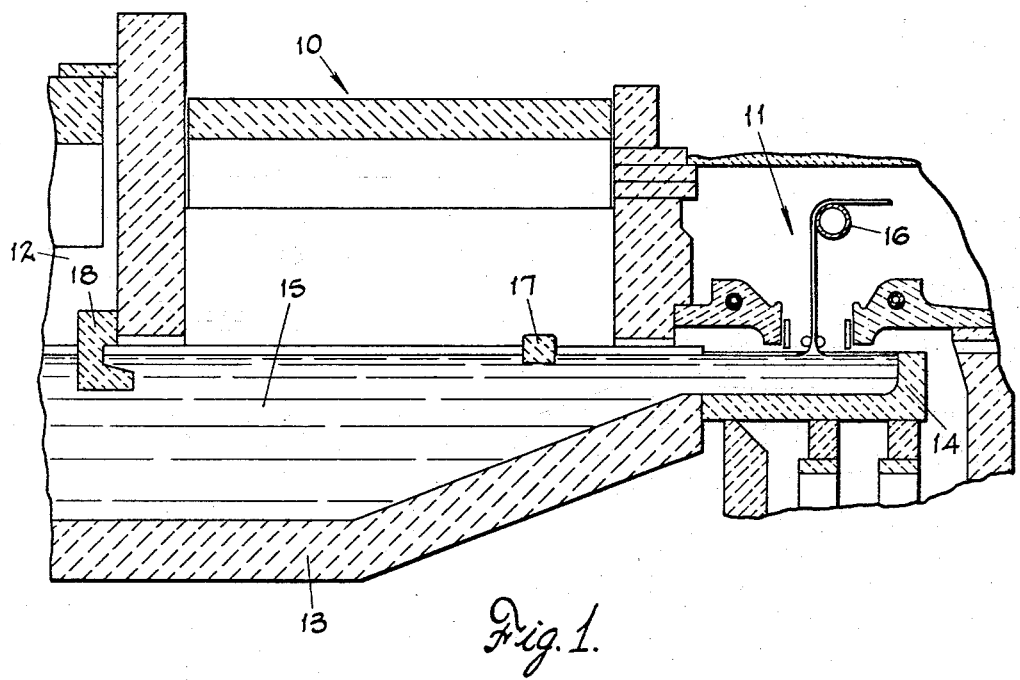
Fig. 1.
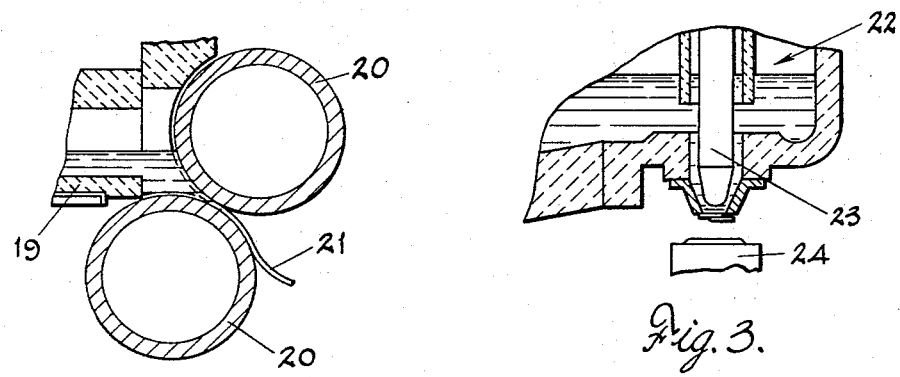
Fig. 2.
Fig. 3.
INVENTORS
Thomas B. O'Connell, Alfred E. Badger,
BY Walter J. Wilson and
John W. Herbert
Nobbe & Swope
ATTORNEYS June 6, 1967

T. B. O'CONNELL ET AL 3,323,927

GLASS CONTACTING REFRACTORIES

Filed Nov. 6, 1961

INVENTORS
Thomas B. O'Connell, Alfred E. Badger,
Walter J. Wilson and
John W. Herbert
BY
Hobbe & Swope
ATTORNEYS INVENTORS
Thomas B. O'Connell, Alfred E. Badger,
BY Walter J. Wilson and
John W. Herbert
Nobbe & Swope
ATTORNEYS United States Patent Office 3,323,927
Patented June 6, 1967

3,323,927
GLASS CONTACTING REFRACTORIES
Thomas B. O'Connell, Toledo, Alfred E. Badger, Maumee, and John W. Herbert, Toledo, Ohio, and Walter I. Wilson, Charleston, W. Va., assignors to Libbey-Owens-Ford Glass Company, Toledo, Ohio, a corporation of Ohio
Filed Nov. 6, 1961, Ser. No. 150,362
3 Claims. (Cl. 106—57)

The present invention relates broadly to the manufacture and processing of glass. More particularly it has to do with improvements in the refractories that are commonly used in contact with the hot glass during such manufacture and processing whereby to substantially eliminate certain troublesome defects in the finished glass.

As is well known, glass is used to produce a wide variety of different products, most of which fall into one or the other of the broad classifications of flat glass and glass containers. Practically all such glass products are produced by first combining raw glass making materials with scrap glass into a mixture known as batch and then melting the batch in the melting tank of a glass furnace. The resulting mass of molten glass then flows through refining and conditioning areas in the furnace and into a working area from which the molten glass is withdrawn and formed into a ribbon, sheet or other shaped or molded articles.

Both flat glass and glass containers are subject to certain defects that are more or less inherently created during manufacture or processing of the glass between the melting and the working ends of the furnace. Some of these defects are peculiar to or may be more objectionable in flat glass, while others are peculiar to or more objectionable in glass containers. Still others are common to and objectionable in both classes of glass products. Among the latter are so-called cords and seeds. Cordiness appears in the finished glass as streaks which create undesirable optical effects and actually decrease the mechanical strength of the product. Seeds appear as tiny bubbles or blisters in the glass.

Briefly stated, the present invention contemplates the substantial elimination of such cords and seeds, and/or the effect thereof in the finished glass, by employing refractories of a special composition for contact with the glass in the furnace.

To explain, in the commercial production of glass by presently known and used methods, it is accepted procedure to have the glass contacting portions of the furnace, and also various members used in processing and directing the molten glass through the furnace and in shaping it toward its final finished form, constructed of refractory materials such as clay, zircon or the like. In fact such materials are employed for substantially all glass contacting areas of and in the furnace and have been generally considered to be the best suited for the purpose.

However, as would be expected, these refractories are subject to normal corrosion due to the extreme heat, continuous movement and similar deleterious effects of the action of the hot glass thereagainst. Thus, when hot glass, and especially molten glass, attacks a refractory, the "glass" formed by the attack has a chemical composition intermediate that of the refractory and the "primary" glass. The "refractory glass" so formed produces both cords and seeds in the finished glass, the cords being merely "streaks" of the refractory glass and the seeds probably originating either from the air contained in the porous refractory which is being dissolved slowly in the molten glass or from liberation of dissolved gasses present in the glass.

Moreover, when molten glass dissolves a conventional clay or zircon refractory, the resulting glassy cords have a different index of refraction than that of the main body of the glass and this difference in refractive index makes such cords particularly noticeable and objectionable in the finished product.

It is an important object of this invention to eliminate the objectionable effect of cords that are formed by contact between the glass and refractory by rendering them substantially invisible.

Such cords may still be noticeable where they have a slightly different dispersion than that of the glass, or where they have not been rendered completely invisible, and a further object of the invention is to provide an improved refractory composition which will also act to reduce the surface tension of the cords and so spread and diffuse them through the main body of the glass.

Another object is to provide a special refractory that will favor the removal of both cords and seeds from the glass.

Further objects and advantages will be apparent in the course of the following description when taken in connection with the accompanying drawings.

In the drawings:

FIG. 1 is a longitudinal, sectional view through a portion of one type of continuous flat glass furnace illustrating the use of the improved refractory of the invention in glass contacting portions of the furnace itself and in processing and directing members in the furnace in making window glass;

FIG. 2 is a longitudinal, sectional view through a discharge spout and forming rolls used in producing plate glass from a conventional flat glass furnace and illustrating a somewhat different use of the improved refractory material;

FIG. 3 is a longitudinal, sectional view through the discharge and forming end of a conventional container furnace, also showing an application of the invention.

Figure 4:
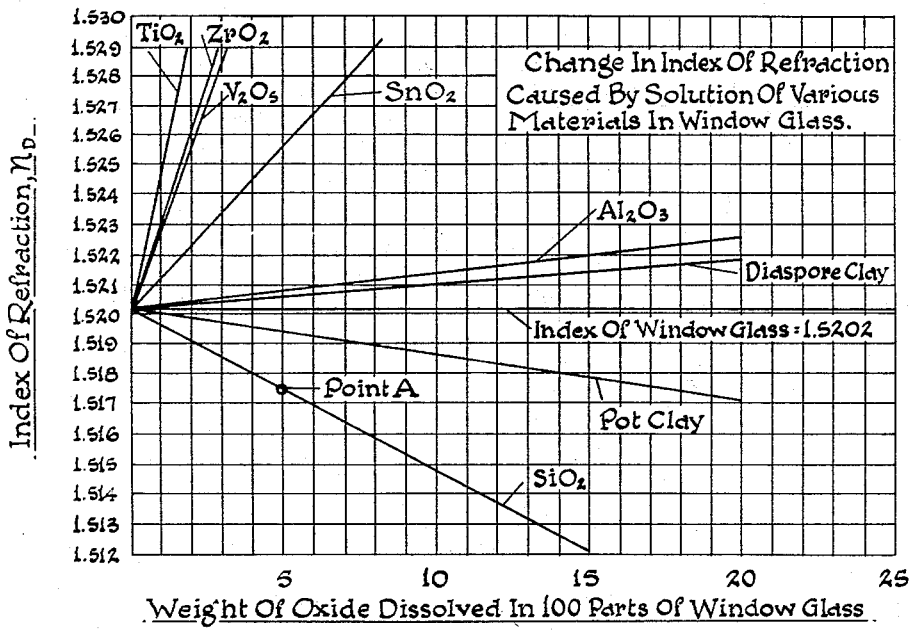
FIGS. 4 to 7 are charts, graphically illustrating the effect on the refractive indices of a number of materials which may be used in producing the improved refractory of the invention.

Referring now more particularly to the drawings, there has been illustrated in FIG. 1 a portion of the refining and processing end of a conventional glass furnace 10 having a window glass drawing machine 11 associated with the working end thereof.

As indicated above, such flat glass furnaces ordinarily include a melting tank (not shown), a refining tank 12 in open communication with the melting tank and a cooling or conditioning chamber 13 leading from the refining tank to a working receptacle which, in the case of the window glass furnace illustrated in FIG. 1, is a draw pot 14. Molten glass 15 flows through the furnace 10 from the melting to the working end and a ribbon of glass is continuously drawn upwardly from the bath of molten glass in the draw pot 14 and is deflected into the horizontal plane over a bending roll 16 in accordance with conventional procedures.

In such a furnace all of the walls of the furnace, including refining chamber 12, the cooling chamber 13 and the draw pot 14, are customarily made of the conventional refractory materials that have heretofore been considered suitable for the purpose and the invention can be practiced by making any or all of these walls, or any of the blocks from which the walls are made, that are in contact with the molten glass, of the special refractory material referred to above and which will be more fully hereinafter described.

It can also be practiced by making any or all glass contacting parts of such processing or glass directing members as the floater 17 or the C-bar 18 that are shown in FIG. 1 of the special refractory material. The floater 17 is provided for skimming off objectionable impurities on the surface of the molten glass before it reaches the working end of the furnace and the C-bar 18 is provided for the dual purpose of sealing off the atmosphere above the cooling chamber 13 from the atmosphere above the refining chamber 12 and also for its skimming action on the glass.

FIG. 2 illustrates the working end of a flat glass furnace which may be similar to the one shown in FIG. 1 but which, instead of being provided with a draw pot 14, has a flow spout 19 which feeds the molten glass to the pass between a pair of forming rolls 20 which roll the glass into a continuous blank ribbon 21 of predetermined thickness that can subsequently be ground and polished to produce the finished plate glass. The invention can be practiced in connection with a plate glass apparatus of this type by making any glass contacting portion of the flow spout 19 of the special refractory.

FIG. 3 illustrates the working end of a conventional container glass furnace in which the molten glass flows into a forehearth or working receptacle 22 from which gobs of the molten glass are periodically discharged by means of a plunger or the like 23 into a mold 24 which forms the gobs into glass articles of the desired shape. The invention may be practiced in connection with this type of container apparatus by making any glass contacting portion of the forehearth 22 or of the feeding apparatus of the special refractory. It will be understood of course that here, as is the case with the flat glass furnace of FIG. 1, any glass contacting portion of the furnace that feeds into the forehearth 22 or any glass contacting part of any processing or directing member in the furnace can be made of the special refractory in accordance with this invention.

As has already been pointed out, it is a primary purpose of the invention to substantially reduce, if not to entirely eliminate, the objectionable effects of cords and seeds in any of the finished glass products produced from furnaces of the above character.

All such furnaces must be operated at extremely high temperatures and wherever the molten glass flows in contact with prior known refractory walls of such furnaces, or of the processing or directing members in the furnace, cords and seeds tend to be produced by the attack of the glass on such refractories. These cords are highly objectionable because the "refractory glass" in the cords, which is formed by the dissolving of the refractory by the glass, has a different index of refraction from the index of refraction of the main body of the glass; and this difference in the refractive index results in such cords being clearly apparent in the finished product.

Thus we have found that when molten glass dissolves an ordinary pot clay refractory, the resulting glassy cords have a lower index refraction than that of the main body of the glass while when a zircon type of refractory is used the cords are higher in index refraction.

However, we have also found, and this is an important feature of the invention, that by formulating and substituting a refractory composition which will melt into a "refractory glass" that has substantially the same index of refraction as the particular kind of glass being produced in the furnace, any cords that are formed by the attack of the molten glass on such a special refractory will be practically invisible in the finished glass.

For example, because the ordinary clay refractories produce cords of refractory glass having a lower index of refraction while zircon refractories produce cords of refractory glass having a higher index of refraction than the main body of the glass being produced, the invention may be practiced by formulating a refractory made up of combined clay and zirconia in proportions which will produce cords having the same index of refraction as that of the glass. Thus, in a furance producing soda-lime-silica window glass we have found that a mixture of 95.1 parts of pot clay with 4.9 parts of zirconia gives very satisfactory results.

Similarly, other known types of refractories which will produce refractory glass upon contact with molten glass that have indices of refaction higher and lower than the index of refraction of the glass can be combined in appropriate proportions for the same purpose. Also refractories having an index of refraction either above or below the index of refraction of the glass with which they are to be used may be combined with other materials which will not adversely affect the glass but which will act to substantially increase or decrease the index of refraction when dissolved in glass may be combined with the refractories to produce the desired increase or decrease in refractive index. Among such refractories and materials are silica, pot clay, diaspore clay, alumina, zirconia, tin oxide and titanium oxide. There are of course a large number of other materials that can be used. However, at least some of them are probably impracticable or undesirable. For example, lead oxide and barium oxide will result in high increases in index, but these materials are fluxes and are not advisable for use in refractories.

In the graph in FIG. 4 there has been illustrated the effect various weight of a few of the more common and practicable materials and refractories we have used will have on the refractive index when dissolved in 100 parts of window glass, the approximate chemical composition of which is:

*Window glass*

| | Percent |
|---|---|
| $SiO_2$ | 72.5 |
| $Fe_2O_3$ | 0.15 |
| $Al_2O_3$ | 1.0 |
| $CaO$ | 9.1 |
| $MgO$ | 3.5 |
| $Na_2O$ | 13.2 |
| Minor | 0.55 |
| Total | 100.0 |

The index of refraction of window glass is 1.5202 and is shown by the horizontal datum line in the graph of FIG. 4. As also shown, when silica ($SiO_2$) or pot clay is dissolved in window glass, a progressive decrease in the index of refraction is produced; pot clay being made up mainly of silica and alumina with a high percentage of silica and having substantially the following analysis:

*Pot clay*

| | Percent |
|---|---|
| $SiO_2$ | 58.5 |
| $Al_2O_3$ | 26.7 |
| Minor | 3.3 |
| LOI (lost on ignition) | 11.5 |
| Total | 100.0 |

The graph further illustrates that such compounds and refractories as titania, zirconia, tin oxide, alumina and diaspore clay have an effect opposite to that of $SiO_2$ and pot clay in that, when dissolved in window glass, they give a progressive increase in the index of refraction; diaspore clay having a relatively high alumina content and approximately the following analysis of the calcined material:

*Diaspore clay*

| | Percent |
|---|---|
| $SiO_2$ | 31.56 |
| $Fe_2O_3$ | 1.11 |
| $Al_2O_3$ | 49.96 |
| $TiO_2$ | 2.90 |
| $CaO$ | 0.24 |
| $MgO$ | 0.28 |
| $Na_2O$ | 0.11 |
| LOI | 13.43 |
| Total | 99.59 |

The analyses for pot clay and diaspore clay as given above are of clays obtained from the Walsh Refractories Co. Clays from other manufacturers, if they differ in composition will, of course, have specifically different effects on the index of refraction.

Figure 5:
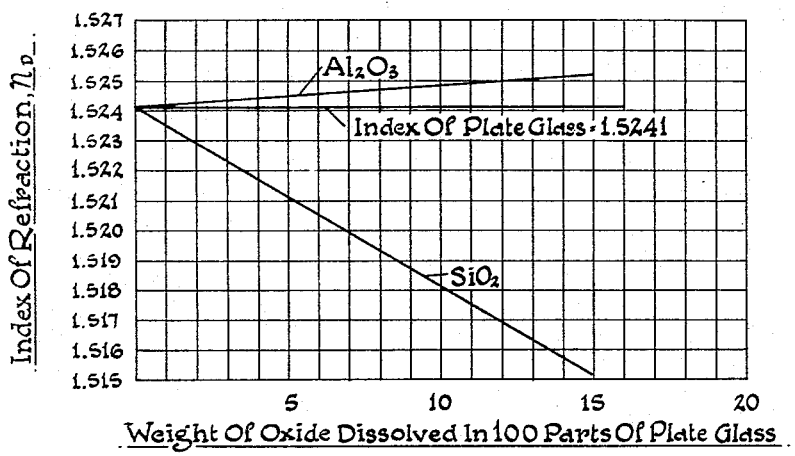

The graph of FIG. 5 is similar to that of FIG. 4 but illustrates the effects of alumina and silica on the refractive index of plate glass which is generally 1.5241; plate glass having approximately the following chemical composition:

*Plate glass*

| | Percent |
|---|---|
| $SiO_2$ | 72.1 |
| $Fe_2O_3$ | 0.12 |
| $Al_2O_3$ | 0.1 |
| CaO | 11.2 |
| MgO | 2.1 |
| $Na_2O$ | 13.7 |
| Minor | 0.68 |
| Total | 100.00 |

It is evident from these two graphs (FIGS. 4 and 5) that, since alumina raises the index of refraction when dissolved in glass and silica causes a decrease, that a suitable silica-alumina refractory can be formulated for use in a plate glass and one for use in a window glass furnace and that will cause no change in the index of refraction when attacked by the molten glass. Consequently, cords from such special refractories would be practically invisible, assumming that there is no selective solution of one constituent of the refractory over another.

Figure 6:
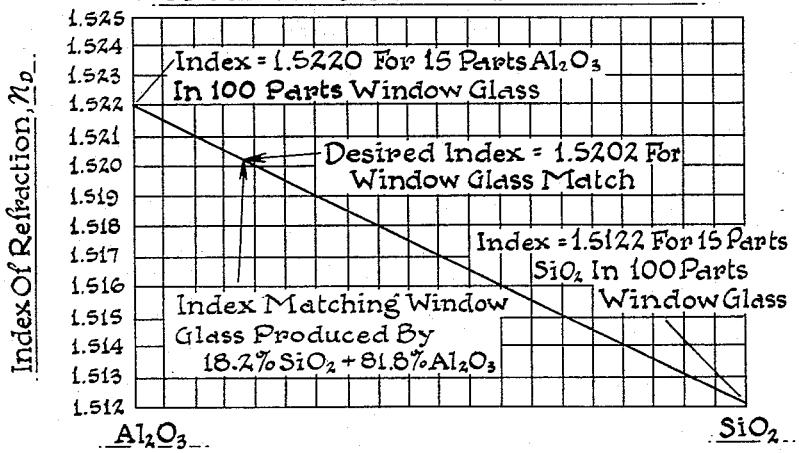
Figure 7:
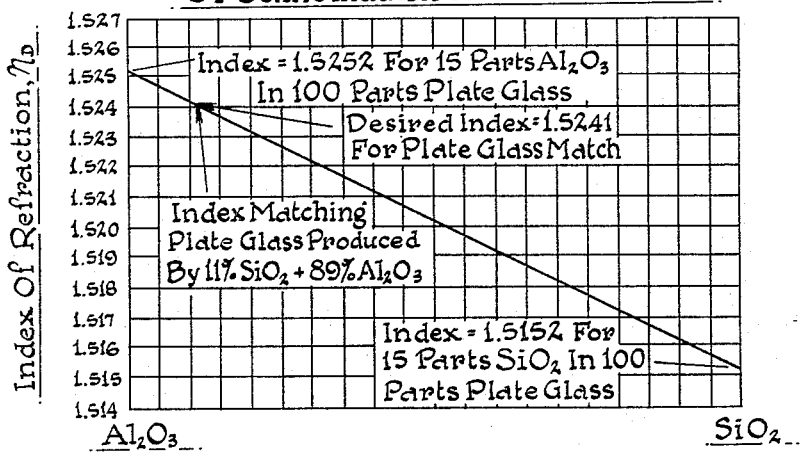

That aluminia-silica compositions of this character and which would produce only cords in which the refractory glass matches the index of refraction of the window glass or plate glass with which they are in contact can be determined graphically as shown in FIGS. 6 and 7 from the data illustrated in FIGS. 4 and 5.

Thus, FIG. 6 shows that the composition of 18.2% $SiO_2$ plus 81.8% $Al_2O_3$ will be suitable for use as a refractory for window glass and FIG. 7 shows that a composition of 11% $SiO_2$ plus 89% $Al_2O_3$ will be suitable as a refractory for plate glass.

In measuring and determining the change in index of refraction when pure $SiO_2$ is dissolved in window glass for the purpose of preparing the graphs of FIGS. 4 to 7, the procedure followed can best be explained by reference to point A in FIG. 4. This point was determined as follows:

Five parts of pure powdered silica were mixed with 100 parts of powdered window glass. The mixture was placed in a platinum crucible and heated at 2600° F. for two hours which was sufficient to produce the solution of the silica in the glass. The glass from this melt was homogenized by crushing and remelting for several hours at 2300° F. The resulting slug of glass was carefully annealed, ground and polished and its index of refraction measured within an Abbe refractometer.

By adding different amounts of silica to powdered glass and repeating the above procedure several points were obtained to determine the straight line curve for $SiO_2$ shown in FIG. 4 which shows a progressive decrease in the index of refraction as the silica content is increased. The same procedure was followed to establish the line for alumina in FIG. 4 and also for the other compounds and refractories referred to in the figure.

Although it has been shown above that pure alumina and silica can be formulated according to the invention into a refractory that will give very satisfactory results, in actual practice it is preferred to use readily available commercial materials for the purpose. For example, as explained above, ordinary pot clay which is widely used in the manufacture of refractories is high in silica and its solution in window glass will form cords of a lower refractive index than that of the glass. Conversely, diaspore clay, which is also a commercially available product, is low in silica and high in alumina so that cords produced by the diaspore clay will have a higher index of refraction than that of window glass. This has been proved to be correct by numerous melts following the same procedure as has been set forth above in establishing the effects of pure alumina and silica for the graph of FIG. 4.

Consequently a blend of ordinary pot clay and diaspore clay will produce cords with indices matching the index of window glass and this blend has been found by the graphical method to be:

| | Percent |
|---|---|
| Pot clay | 34.5 |
| Diaspore clay | 65.5 |

It is desirable in a successful commercial refractory that it have a simple composition and the chief constituent of the above refractory is clay, the action of which on the refractive index of the glass with which it comes in contact having been modified by combining pot clay with diaspore clay. Obviously a refractory which is predominantly pot clay but which will have the desired effect on the index of refraction of the glass can also be formulated by suitable additions of other refractory materials or compounds which act to increase the index of refraction.

Thus, the graph of FIG. 4 shows that there is a marked increase in index of refraction resulting from solutions of $TiO_2$, $ZrO_2$ and $SnO_2$. The manner in which zirconia and pot clay can be combined in practicing the invention has been discussed above, as has the combining of diaspore clay and pot clay. Numerous other refractory compositions which would not change the index of refraction when dissolved in glass can be formulated from the data of FIG. 4.

In this connection it is important to note that two-component compositions can be determined readily by the graphical method but, for multi-component compositions, it is advisable to use factors for each oxide. The necessity of determining a multi-component composition may arise, for example, when it is desired to add a material for a distinctly different purpose which, nevertheless, has a noticeable effect on the refractive index. Vanadium oxide is such a material. The purpose of its addition will be explained hereinafter and its effect on the refractive index is shown in FIG. 4 to be similar to that of zirconium oxide.

The following are factors that represent the increase or decrease in index of refraction when one part of each oxide is dissolved in 100 parts of glass as deduced from FIG. 4. These factors can be readily used to formulate numerous refractory compositions that will produce the desired results. The sum of positive deviations in index of refraction is made equal to the sum of negative deviations. The factors only apply precisely to refractories for window glass. For plate glass a slightly different set of factors can be developed.

*Table of factors for various materials*

| Material: | Factor |
|---|---|
| $SiO_2$ | −.00054 |
| Pot clay | −.000155 |
| Diaspore clay | +.0000815 |
| $Al_2O_3$ | +.00012 |
| $SnO_2$ | +.00109 |
| $V_2O_5$ | +.00283 |
| $ZrO_2$ | +.00304 |
| $TiO_2$ | +.00478 |

The use of these factors is illustrated in solving the problem of finding a mixture of pot clay and zirconium oxide with 3% vanadium oxide that will cause no change in index of refraction when dissolved in window glass thus:

Let $x$=wt. pot clay in 100 parts of mixture then $100-x-3$=wt. zirconium oxide and $$.000155x=3(.00283)+(100-x-3)(.00304)$$

whence $x=94.95$ parts pot clay and $100-x-3=2.05$ parts zirconium oxide.

The correct refractory composition is therefore:

|  | Percent |
|---|---|
| Pot clay | 94.95 |
| ZrO$_2$ | 2.05 |
| V$_2$O$_5$ | 3.00 |

A satisfactory refractory using titania instead of zirconia would have the composition:

|  | Percent |
|---|---|
| Pot clay | 95.67 |
| TiO$_2$ | 1.33 |
| V$_2$O$_5$ | 3.00 |

In addition to those already set forth, the following are further representative examples of two and three-component refractories which will produce cords in window glass with index matching properties, formulated in accordance with the invention:

|  | Percent |
|---|---|
| Pot clay+3.14 TiO$_2$ | 96.86 |
| Pot clay+12.44 SnO$_2$ | 87.56 |
| Pot clay+1.75 V$_2$O$_5$+2.08 TiO$_2$ | 96.17 |
| Pot clay+1.75 V$_2$O$_5$+3.22 ZrO$_2$ | 95.03 |
| Pot clay+1.75 V$_2$O$_5$+8.25 SnO$_2$ | 90.00 |

In making up any of these refractories, it is extremely important that the mixture be rendered completely homogenous because, in a refractory member composed of materials that will produce cords of high index with materials that will produce cords of low index, if there exist any discrete islands of one material or the other in the portion of the finished member that will contact molten glass, cords of either higher or lower index than the main body of the glass will form from such islands. However, sufficiently thorough mixing or the different materials before shaping the mixture into the refractory member will effectively prevent this condition.

Returning now to the use of other purpose materials such as vanadium oxide in the formulation. As noted above, this compound does have an effect on the index of refraction quite similar to that of zirconium oxide but it is employed here only in small amounts and primarily for its properties as a dispersion and diffusion agent.

To explain, in employing the present invention in actual commercial practice it may be difficult to obtain an exact match of the indices of refraction of the cords with that of the main body of the glass although we have found that a precision of ±.0002 difference between the indices of the glass and refractory cords may be attained by a suitable choice of the refractory composition.

In any event, however, it may be desirable to add an agent, such as a vanadium compound, that will act to spread and diffuse the cords through the glass as they are formed. Diffused cords are much less apparent in the finished article than are sharply defined cords, regardless of the relationship of their index of refraction to that of the glass. More the effects of diffused cords on other physical properties of the glass, and notably on its viscosity, are much less pronounced.

Tests have shown that optimum beneficial results of dispersion and diffusion can be obtained, with a minimum of objectionable side effects, from an amount of vanadium oxide in the refractory that is between a range of from about 1 to 3% V$_2$O$_5$; and 1¾% has been found to be a good practical working proportion.

Thus, while excessive amounts of vanadium oxide in a clay refractory cause a loss in refractoriness, the recommended amount of about 1¾% has no appreciable effect on the resistance of the refractory to the attack by molten glass. The resistance to attack of ordinary pot clay and pot clay containing about 1¾% vanadium oxide was observed by partly immersing test bars in molten glass for a period of 40 hours at 2350° F. No difference in the amounts of corrosion of the refractories could be observed. The results of these tests were confirmed by similar trials using pots made from the refractories.

However, amounts of vanadium oxide much above the range indicated are to be avoided, first, because of the high cost of the material, second, because of the above indicated loss in refractoriness and, third, because vanadium oxide has some objectionable characteristics which require special handling in producing a satisfactory refractory from a mix in which it is included.

For example, when a refractory mix containing vanadium oxide is combined with water into a stiff-mud consistency, it has been found that troublesome scumming occurs during drying. This scumming results from the slight but appreciable solubility of vanadium oxide in water. Because of this, as the mud dries, the soluble part of the vanadium oxide becomes concentrated near the surface as a scum. Vanadium oxide also stains the hands of the workmen and is a nuisance for this reason if it is not an actual toxic hazard.

However, within the range indicated, it has been found that vanadium oxide can be rendered insoluble and so prevented from scumming by calcining with clay at a high temperature and following this by fine grinding of the sintered mix. For example, a successful procedure for making one of the multi-component refractories listed above is as follows:

(1) Mix 20 parts of pot clay with 3.22 parts ZrO$_2$ and 1.75 parts V$_2$O$_5$ either dry or with methanol.
(2) Calcine the mix to 2700 °F.
(3) Crush and grind the calcine to pass 325 mesh.
(4) Mix the finely divided calcine with 75.03 parts pot clay and add sufficient water for stiff-mud consistency.

The calcining operation, which is necessary to the procedure outlined above, of course adds an extra step to the manufacture of the special refractory; and we have found that this step can be eliminated while retaining the spreading and diffusing properties offered by the vanadium compound, and without objectionable side effects, by employing an insoluble compound of vanadium such as zirconium vanadate. This compound may be obtained from the Harshaw Chemical Co., and has an approximate chemical analysis as follows:

|  | Percent |
|---|---|
| V$_2$O$_5$ | 29.5 |
| ZrO$_2$ | 57.0 |
| LOI | 13.0 |
|  | 100.0 |

One example of a very satisfactory form of the special refractory of the invention can be produced from the following formulation of a clay-type refractory and the zirconium vanadate:

|  | Parts by wt. |
|---|---|
| Zirconium vanadate | 5.69 |
| Pot clay | 94.31 |

In addition to greatly reducing, if not substantially eliminating, the visibility of cords formed by the attack of molten glass thereon, it has been found that the special refractory of the invention actually produces fewer cords in many instances and also a very considerable less number of seeds. Moreover the feature of diffusing or spreading the cords has an important effect on further reducing the number of seeds as well as on reducing the visibility of the cords. Thus cords from refractories are notedly permeated with seeds but these seeds tend to disappear more readily from spreading or diffusing cords.

As has already been explained, the special refractories of this invention are particularly valuable when used anywhere in conventional flat or container glass furnaces where their surfaces will be in contact with molten glass in or moving through such furnaces. Ordinarily speaking, they will be more useful in the so-called "cold end" region of the furnaces. This is because the glass in the melting end always exhibits the extreme cordiness that is characteristic of freshly melted batch so that the advantages of using the special refractories in this area are relatively smaller. The principal advantages will appear in the refining, conditioning and working zones where cords from refractory "block-wash" contaminate glass of better homogeneity than that which exists in the melting end.

Perhaps the greatest advantages from the special refractories will result from their use in processing members such as the floaters or skim bars illustrated at 17 and 18 in FIG. 1 of the drawings. These members, in addition to skimming the glass, also act to provide under-surface glass for the forming machines associated with the working end of the furnace and cords from them, when they are made of standard refractories, have been particularly troublesome in creating objectionable defects in the finished glass. When using such floaters or skim bars in window glass furnaces, for example, they should be used in locations where the glass temperature is about 1900° F. or above because window glass tends to crystallize and form devitrified glass or "dog" at temperatures below about 1860° F. It is also desirable to locate such molten glass contacting members far enough back in the furnace to give any cords formed by the member sufficient time to spread out and diffuse before they reach the forming machine.

It is to be understood that the forms of the invention described herein are to be taken as preferred embodiments only and that various procedural changes, as well as changes in the size, shape and arrangement of parts, and changes in specific compositions, may be resorted to without departing from the spirit or scope of the invention defined in the following claims.

We claim:

1. A refractory for use in window glass furnaces comprising essentially the following materials in approximately the proportions indicated:

| | Percent |
|---|---|
| Pot clay | 94.95 |
| $ZrO_2$ | 2.05 |
| $V_2O_5$ | 3.00 |

2. A refractory for use in glass furnaces comprising essentially the following materials in approximately the proportions indicated:

| | Percent |
|---|---|
| Pot clay | 95.03 |
| $V_2O_5$ | 1.75 |
| $ZrO_2$ | 3.22 |

3. A refractory for use in glass furnaces comprising essentially the following materials in approximately the proportions indicated:

| | Parts by wt. |
|---|---|
| Zirconium vanadate | 5.69 |
| Pot clay | 94.31 |

References Cited
UNITED STATES PATENTS

| 2,748,007 | 5/1956 | Badger et al. | 106—66 |
| 2,842,447 | 7/1958 | Schlotzhauer et al. | 106—65 |
| 2,919,994 | 1/1960 | Steimke | 106—57 |

TOBIAS E. LEVOW, *Primary Examiner.*

JOHN H. MACK, *Examiner.*

J. POER, *Assistant Examiner.*